United States Patent
Kim et al.

(10) Patent No.: US 11,162,005 B2
(45) Date of Patent: Nov. 2, 2021

(54) PRESSURE-SENSITIVE ADHESIVE COMPOSITION

(71) Applicant: SHANJIN OPTOELECTRONICS (SUZHOU) CO., LTD., Zhangjiagang (CN)

(72) Inventors: Kee Young Kim, Daejeon (KR); Sung Soo Yoon, Daejeon (KR); Sang Hyun Hong, Daejeon (KR); Il Jin Kim, Daejeon (KR)

(73) Assignee: SHANJIN OPTOELECTRONICS (SUZHOU) CO., LTD., Zhangjiagang (CN)

(*) Notice: Subject to any disclaimer, the term of this patent is extended or adjusted under 35 U.S.C. 154(b) by 360 days.

(21) Appl. No.: 15/537,089

(22) PCT Filed: Dec. 18, 2015

(86) PCT No.: PCT/KR2015/013918
§ 371 (c)(1),
(2) Date: Jun. 16, 2017

(87) PCT Pub. No.: WO2016/099187
PCT Pub. Date: Jun. 23, 2016

(65) Prior Publication Data
US 2017/0355889 A1  Dec. 14, 2017

(30) Foreign Application Priority Data
Dec. 18, 2014 (KR) .................. 10-2014-0183137

(51) Int. Cl.
*C09J 7/38* (2018.01)
*C09J 133/06* (2006.01)
*G02B 5/30* (2006.01)
*G02F 1/13* (2006.01)
*G01B 5/30* (2006.01)

(52) U.S. Cl.
CPC ............ *C09J 133/06* (2013.01); *C09J 7/385* (2018.01); *C09J 133/066* (2013.01); *G01B 5/30* (2013.01); *G02B 5/3033* (2013.01); *G02F 1/13* (2013.01); *C09J 2203/318* (2013.01); *C09J 2301/414* (2020.08); *C09J 2429/006* (2013.01); *C09J 2431/006* (2013.01); *C09J 2433/00* (2013.01); *Y10T 428/2891* (2015.01)

(58) Field of Classification Search
CPC ............ C09J 133/06; G01B 5/30; G02F 1/13
See application file for complete search history.

(56) References Cited

U.S. PATENT DOCUMENTS

| | | | |
|---|---|---|---|
| 9,045,671 | B2 | 6/2015 | Han et al. |
| 2003/0014435 | A1 | 1/2003 | Devillers et al. |
| 2005/0244633 | A1 | 11/2005 | Kobayashi et al. |
| 2009/0270557 | A1 | 10/2009 | Tomita et al. |
| 2010/0068420 | A1* | 3/2010 | Kim ............ C08F 220/18 428/1.31 |
| 2014/0016067 | A1 | 1/2014 | Yoon et al. |

FOREIGN PATENT DOCUMENTS

| | | |
|---|---|---|
| CN | 1693401 A | 11/2005 |
| CN | 101495586 A | 7/2009 |
| CN | 103429691 A | 12/2013 |
| JP | H05140519 A | 6/1993 |
| JP | 2007138056 A | 6/2007 |
| JP | 2009173720 A | 8/2009 |
| JP | 2011511861 A | 4/2011 |
| KR | 20020047540 A | 6/2002 |
| KR | 20030006946 A | 1/2003 |
| KR | 100405309 B1 | 11/2003 |
| KR | 100932888 B1 | 12/2009 |
| KR | 20120006465 A | 1/2012 |
| KR | 20120073093 A | 7/2012 |
| KR | 101301089 B1 | 8/2013 |
| KR | 20140128887 A | 11/2014 |
| WO | WO-2013099683 A1 * | 7/2013 ............ C09J 133/06 |

OTHER PUBLICATIONS

Machine translation of J PW02013099683 A1, May 7, 2015 (Year: 2015).*
Notification of Reasons for Refusal for Japanese Application No. 2017533282 dated Jul. 2, 2018.
Search report from Chinese Office Action for Application No. 201580069603.X dated Sep. 3, 2018.
International Search Report for Application No. PCT/KR2015/013918 dated Mar. 31, 2016.
Chinese Search Report for Application No. CN 201580069603.X dated Jul. 31, 2019.

* cited by examiner

*Primary Examiner* — Anish P Desai
(74) *Attorney, Agent, or Firm* — Schmeiser, Olsen & Watts, LLP

(57) ABSTRACT

Provided are a pressure-sensitive adhesive composition for an optical film, which has excellent optical compensation and stress relaxation properties without changing main properties such as endurance reliability and workability under a high temperature and/or high humidity condition to minimize a light leakage phenomenon caused by stress concentration of a protective film, and an optical member and a liquid crystal display device which include a pressure-sensitive adhesive layer manufactured using the same.

16 Claims, No Drawings

PRESSURE-SENSITIVE ADHESIVE COMPOSITION

CROSS-REFERENCE TO RELATED APPLICATION

The present application is a national phase entry under 35 U.S.C. § 371 of International Application No. PCT/KR2015/013918 filed Dec. 18, 2015, which claims priority to Korean Patent Application No. 10-2014-0183137, filed on Dec. 18, 2014, the disclosure of which is incorporated herein by reference.

BACKGROUND

1. Field of the Invention

The present application relates to a pressure-sensitive adhesive composition for an optical film, and an optical member and a liquid crystal display device which include the same.

2. Discussion of Related Art

A polarizing plate, as a representative optical member, has a structure including an iodine-based compound or a dichroic polarizing material which is arranged in a predetermined direction, and has a multi-layer structure using, for example, a triacetyl cellulose (TAC)-based protective film on one or both surfaces to protect such a polarizing diode. Also, the polarizing plate may additionally include a wide-viewing angle compensation film such as a retardation film or liquid crystal film having unidirectional molecular arrangement, and a pressure-sensitive adhesive layer or adhesive layer is introduced to bond the protective film, the retardation film or the wide-viewing angle compensation film with a release film.

Since the films described above are formed of materials having different molecular structures and compositions, they have different physical properties. Particularly, dimension stability can be the problem caused by the difference in contraction or expansion behaviors of materials having unidirectional molecular arrangement at high temperature and/or high humidity. Therefore, when the polarizing plate is fixed with a pressure-sensitive adhesive, stress is concentrated on the protective film which includes TAC, etc. due to the contraction or expansion of the polarizing plate under a high temperature and/or high humidity condition, and therefore birefringence is generated and light leakage occurs. In this case, conventionally, a negative birefringence is generated overall due to the contracted TAC.

Meanwhile, the pressure-sensitive adhesive layer needs a high temperature cohesive strength to maintain endurance reliability, and to this end, a partially-crosslinked viscoelastic material form is used. In this case, the pressure-sensitive adhesive layer has a residual stress under a given strain, and therefore a polymer in the crosslinked structure is oriented in a specific direction, and thus birefringence is exhibited. Due to such an orientation, generally, an acrylic pressure-sensitive adhesive has a negative birefringence value like TAC.

Therefore, as a method of minimizing light leakage occurring under the residual stress, a method of compensating birefringence of the protective film including TAC and the pressure-sensitive adhesive layer by adding a material having a positive birefringence to a final pressure-sensitive adhesive layer, or forming a pressure-sensitive adhesive layer by copolymerizing an acrylic monomer having a positive birefringence is considered in Patent Document 1 (Korean Unexamined Patent Application Publication). However, there are difficulties, for example, a reduction in cuttability while working on a polarizing plate or the size of a residual stress of the pressure-sensitive adhesive layer while manufacturing the pressure-sensitive adhesive layer performing an optical compensation function by offsetting the birefringence of the pressure-sensitive adhesive layer and the protective film under high temperature and/or a high humidity condition.

Also, static electricity may lead to various problems throughout the whole electronics industry, and fine dust entering an electronic component due to static electricity may cause a problem such as temporary or permanent damage of the component, malfunction or process delay, as well as a mechanical damage. To solve such problems, improvements in antistatic technology as well as the development of the electronics industry are consistently being developed.

For example, in the process of manufacturing a liquid crystal display device, a process of removing a release film from a pressure-sensitive adhesive to attach a polarizing plate to a liquid crystal panel is accompanied by, and thus generates static electricity. Therefore, the static electricity may influence the orientation of liquid crystals of the liquid crystal display device, interfere with product examination, or cause damage to an electronic component.

For this reason, there is an attempt to improve an antistatic property of a pressure-sensitive adhesive layer by mixing a material having an antistatic function, which is disclosed in Patent Document 2, but there are problems of contamination caused by transferring a pressure-sensitive adhesive component, or inhibition of a temporal change in the antistatic property.

PRIOR ARTS

Patent Documents

Patent Document 1: Korean Unexamined Patent Application Publication No. 2003-006946
Patent Document 2: Japanese Unexamined Patent Application Publication No. 1993-140519

SUMMARY OF THE INVENTION

The present application is directed to providing a pressure-sensitive adhesive composition for an optical film which has excellent optical compensation and stress relaxation properties without changing main properties such as endurance reliability and workability under a high temperature and/or high humidity condition to minimize a light leakage phenomenon caused by stress concentration of a protective film.

Also, the present application is directed to providing a pressure-sensitive adhesive composition for an optical film which has an excellent chelating property with respect to an antistatic agent and therefore has an excellent antistatic performance, and has less temporal change in antistatic performance even when in long-term storage.

Moreover, the present application is also directed to providing an optical member and a liquid crystal display device which include a pressure-sensitive adhesive layer formed by the above-described pressure-sensitive adhesive composition for an optical film.

In one aspect, the present application provides a pressure-sensitive adhesive composition for an optical film which includes a polymer including 60 to 80 parts by weight of an alkyl (meth)acrylate having an alkyl group having 4 to 12 carbon atoms, 1 to 5 parts by weight of a monomer of Formula 1, 5 to 20 parts by weight of a polymerizable monomer having an aromatic group, 7 to 12 parts by weight of a hydroxyalkyl (meth)acrylate having an alkyl group having 2 or less carbon atoms, 0.1 to 2 parts by weight of a hydroxyalkyl (meth)acrylate having an alkyl group having in the range of 3 to 6 carbon atoms, and 0.01 to 0.5 parts by weight of a carboxyl group-containing a polymerizable monomer as a polymerization unit with respect to a total of 100 parts by weight:

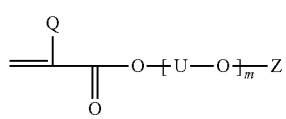

[Formula 1]

In Formula 1, Q is hydrogen or an alkyl group having 1 to 4 carbon atoms, U is an alkylene group having 1 to 4 carbon atoms, Z is an alkyl group having 1 to 20 carbon atoms, and m is a number in the range of 1 to 3.

In another aspect, the present application provides an optical member and liquid crystal display device which include a pressure-sensitive adhesive layer formed from the pressure-sensitive adhesive composition including the polymer.

DETAILED DESCRIPTION OF EXEMPLARY EMBODIMENTS

Exemplary embodiments of the present application will be described in detail below with reference to the accompanying drawings, but the embodiments are just limited by the essence of the present application. While the present application is not limited to processing conditions presented in the following embodiments, it should be apparent to those skilled in the art that the processing conditions are arbitrarily selected within the range of conditions required to achieve the purpose of the present application.

The present application relates to a pressure-sensitive adhesive composition including a polymer, and an optical member and a liquid crystal display device which include a pressure-sensitive adhesive layer formed therefrom.

The pressure-sensitive adhesive composition of the present application may include a polymer containing a functional group capable of chelating with an antistatic agent, for example, an alkylene oxide group, and therefore may be used to manufacture a pressure-sensitive adhesive layer having an excellent antistatic performance and less temporal change in antistatic performance even when in long-term storage.

Also, the pressure-sensitive adhesive composition of the present application may use a material having a positive birefringence property, for example, a polymerizable monomer including an aromatic group in the polymerization of a polymer, and therefore may optically compensate a negative birefringence that may be generated by a stress of a protective film including TAC, etc. and minimize a light leakage phenomenon.

Moreover, the pressure-sensitive adhesive composition of the present application essentially contains a hydroxyalkyl (meth)acrylate having an alkyl group having 2 or less carbon atoms and a hydroxyalkyl (meth)acrylate having 3 to 6 carbon atoms at a predetermined amount, and essentially contains a carboxyl group-containing a polymerizable monomer at a predetermined amount, and therefore an excellent antistatic property and a low light leakage property may be provided to the pressure-sensitive adhesive layer formed from the composition and the optical member including the same.

The present application relates to a pressure-sensitive adhesive composition for an optical film including a polymer which includes 60 to 80 parts by weight of an alkyl (meth)acrylate having an alkyl group having 4 to 12 carbon atoms, 1 to 5 parts by weight of a monomer of Formula 1, 5 to 20 parts by weight of a polymerizable monomer including an aromatic group, 7 to 12 parts by weight of a hydroxyalkyl (meth)acrylate having an alkyl group having 2 or less carbon atoms, 0.1 to 2 parts by weight of a hydroxyalkyl (meth)acrylate having an alkyl group having in the range of 3 to 6 carbon atoms, and 0.01 to 0.5 parts by weight of a carboxyl group-containing polymerizable monomer as polymerization units.

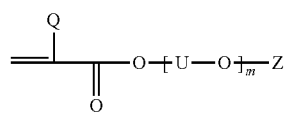

[Formula 1]

In Formula 1, Q is hydrogen or an alkyl group having 1 to 4 carbon atoms, U is an alkylene group having 1 to 4 carbon atoms, Z is an alkyl group having 1 to 20 carbon atoms, and m is a number in the range of 1 to 3.

The part by weight of each component is based on a total of 100 parts by weight, and the term "parts by weight" used herein may refer to, unless particularly defined otherwise, a ratio of weights between components.

The term "polymerization unit" used herein may refer to a state in which a predetermined monomer is polymerized to form a polymer, and thus is included in a main chain or side chain of the polymer.

The term "(meth)acrylate" used herein refers to an acrylate or methacrylate.

When a content of each monomer polymerized and included in the polymer of the present application is in the above-described range, a desired antistatic performance and light leakage preventing effect may be achieved.

A weight average molecular weight (Mw) of the polymer included in the composition may be a weight average molecular weight (Mw) not enough to be a problem in terms of endurance reliability of the pressure-sensitive adhesive layer, for example, bubbles in the pressure-sensitive adhesive layer or a peeling phenomenon of the pressure-sensitive adhesive layer under a high temperature and/or high humidity condition due to a decrease in cohesive strength, or a decrease in coatability due to an increased viscosity.

In one example, the weight average molecular weight (Mw) may be in the range of 500,000 to 2,500,000. When the weight average molecular weight (Mw) of the polymer is less than 500,000, due to a low viscosity, bubbles may be generated in the pressure-sensitive adhesive layer, or an interlayer peeling phenomenon may occur, and when the weight average molecular weight (Mw) is more than 2,500,000, there is concern of a reduction of coatability due to an increase in viscosity. In the present application, the weight average molecular weight (Mw) is a value converted with respect to standard polystyrene measured by gel permeation chromatography (GPC), which is, for example, a value measured using a Waters Alliance System measuring apparatus. In another example, the weight average molecular weight (Mw) of the polymer may be in the range of 1,000,000 to 2,000,000 or 1,300,000 to 1,700,000.

The polymer may include 60 to 80 parts by weight of an alkyl (meth)acrylate having an alkyl group having 4 to 12 carbon atoms as a polymerization unit.

That is, the polymer of the present application may include 60 to 80 parts by weight of an alkyl (meth)acrylate such as t-butyl (meth)acrylate, n-butyl (meth)acrylate, sec-butyl (meth)acrylate, 2-ethylbutyl (meth)acrylate, pentyl (meth)acrylate, 2-ethylhexyl (meth)acrylate, n-octyl (meth) acrylate, isooctyl (meth)acrylate or isononyl (meth)acrylate as a polymerization unit. In the range of the ratio of the polymerization unit, a desired glass transition temperature and molecular weight of the polymer may be achieved.

In another example, the polymer may include 60 to 75, 60 to 72 or 65 to 72 parts by weight of the alkyl (meth)acrylate having an alkyl group having 4 to 12 carbon atoms as a polymerization unit.

The polymer may include 1 to 5 parts by weight of a monomer of Formula 1 as a polymerization unit.

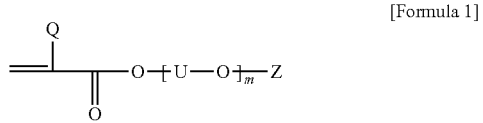

[Formula 1]

In Formula 1, Q is hydrogen or an alkyl group having 1 to 4 carbon atoms, U is an alkylene group having 1 to 4 carbon atoms, Z is an alkyl group having 1 to 20 carbon atoms, and m is a number in the range of 1 to 3.

In Formula 1, when there are two or more [—U—O—] units, the number of carbon atoms of the "U"s in the units may be the same as or different from each other, and in Formula 1, m may be an integer in the range of 1 to 3.

The monomer of Formula 1 is an alkylene oxide group-containing (meth)acrylate compound, and when such an alkylene oxide group is included in the polymer, the polymer may have an excellent chelating property with respect to an antistatic agent and therefore an excellent antistatic performance and temporal change in the antistatic performance may be decreased even when in long-term storage.

In a more specific example, the monomer of Formula 1 may be 2-(2-ethoxyethoxy)ethyl (meth)acrylate or methoxyethyl (meth)acrylate, but the present application is not limited thereto. A monomer which has the structure of Formula 1 and achieves a desired antistatic performance may be selected without limitation.

The monomer of Formula 1 may be included in the polymer at 1 to 5 parts by weight as a polymerization unit. In such a range, a desired excellent antistatic performance may be ensured. In another example, the monomer of Formula 1 may be included in the polymer at 2 to 5 or 3 to 5 parts by weight as a polymerization unit.

The polymer includes 5 to 20 parts by weight of a polymerizable monomer including an aromatic group as a polymerization unit.

In the present application, the polymerizable monomer including an aromatic group may have a positive birefringence property, and may be a component selected to correct the negative birefringence caused by the stress of a protective film including TAC, etc. and the residual stress of the polymer.

In one example, the polymerizable monomer including an aromatic group may be represented by Formula 2.

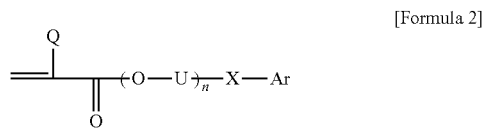

[Formula 2]

In Formula 2, Q is hydrogen or an alkyl group having 1 to 4 carbon atoms, U is an alkylene group having 1 to 4 carbon atoms, X is a single bond, an oxygen atom, a sulfur atom or an alkylene group having 1 to 4 carbon atoms, n is a number in the range of 0 to 3, and Ar is an aryl group having 6 to 25 carbon atoms.

In Formula 2, the aryl group may be, but is not limited to, a phenyl group, a phenoxy group, a phenoxyphenyl group, a phenoxybenzyl group, a dichlorophenyl group, a chlorophenyl group, a phenylethyl group, a phenylpropyl group, a benzyl group, a tolyl group, a xylyl group or a naphthyl group, and may or may not include a halogen atom.

In Formula 2, when there are 2 or more [—O—U—] units, the number of carbon atoms of the "U" s in the units may be the same as or different from each other, and in Formula 2, n may be an integer in the range of 0 to 3.

In a more specific example, the monomer including an aromatic group may be, but is not limited to, phenoxy ethyl (meth)acrylate, benzyl (meth)acrylate, 2-phenylthio-1-ethyl (meth)acrylate, 2-(1-naphthyloxy)-1-ethyl (meth)acrylate or 2-(2-naphthyloxy)-1-ethyl (meth)acrylate.

The polymerizable monomer including an aromatic group may be included in the polymer at a polymerization unit ratio of 5 to 20 parts by weight in a polymerized state. When the polymerization unit ratio of the polymerizable monomer including an aromatic group is less than 5 parts by weight, negative birefringence is increased under the residual stress of a final pressure-sensitive adhesive layer, an optical compensation effect is insignificant, and thus a light leakage problem may not be improved, and when the polymerization unit ratio of the polymerizable monomer including an aromatic group is more than 20 parts by weight, positive birefringence may be increased, light leakage may not be improved, and a pressure-sensitive adhesive property of the polymer may be deteriorated due to a high glass transition temperature of the aromatic group, thereby having low endurance reliability.

In another example, the polymerizable monomer including an aromatic group may be included in the polymer at a polymerization unit ratio of 7 to 12 or 8 to 11 part by weight.

The polymer included in the pressure-sensitive adhesive composition of the present application may include a cross-linkable functional group to implement a crosslinking structure by a multifunctional crosslinking agent, which will be described later, for example, a polymerization unit of the polymerizable monomer capable of providing a crosslinkable functional group.

For example, the polymer includes a polymerization unit of an alkyl (meth)acrylate having a hydroxyl group.

The polymer of the present application may include the hydroxyl alkyl (meth)acrylate having an alkyl group having 2 carbon atoms, in addition to those having an alkyl group having 2 or less and in the range of 3 to 6 carbon atoms at the same time, and therefore the endurance reliability, pressure-sensitive adhesive strength and cohesive strength of the pressure-sensitive adhesive layer may be suitably controlled under a high temperature and/or high humidity condition.

In one example, the polymer includes 7 to 12 parts by weight of a hydroxyalkyl (meth)acrylate having an alkyl group having 2 or less carbon atoms and 0.1 to 2 parts by weight of a hydroxyalkyl (meth)acrylate having in the range of 3 to 6 carbon atoms as polymerization units.

The hydroxyalkyl (meth)acrylate having an alkyl group having 2 or less carbon atoms may be, for example, 2-hydroxyethyl (meth)acrylate, and the hydroxyalkyl (meth)acrylate having an alkyl group having in the range of 3 to 6 carbon atoms may be, for example, 4-hydroxybutyl (meth)acrylate, but the present application is not limited thereto.

The polymer also includes 0.01 to 0.5 parts by weight of a carboxyl group-containing polymerizable monomer as a polymerization unit. Within the above range of the polymerization unit, a suitable crosslinking degree may be ensured, the endurance reliability such as heat and humidity resistances of the pressure-sensitive adhesive layer may be enhanced, and a pressure-sensitive adhesive strength and a cohesive property influencing repeelability, coatability, etc. may be ensured.

The carboxyl group-containing polymerizable monomer may be (meth)acrylic acid, 2-(meth)acryloyloxy acetic acid, 3-(meth)acryloyloxy propylic acid, 4-(meth)acryloyloxy butyric acid, an acrylic acid dimer, itaconic acid, maleic acid, or maleic acid anhydride.

The polymer may further include a methyl (meth)acrylate to adjust a cohesive strength, a glass transition temperature and a pressure-sensitive adhesive property. The methyl (meth)acrylate may be included at a polymerization unit ratio of, for example, 1 to 5, 2 to 5 or 3 to 5 parts by weight.

The polymer may further include a polymerization unit of a functional monomer to adjust the glass transition temperature and provide other functionalities. The term "functional monomer" used herein may refer to a monomer, which has an unsaturated double bond and is capable of being added to adjust the glass transition temperature and provide other functionalities of the polymer.

The functional monomer capable of being polymerized to the polymer may be a compound represented by Formula 3.

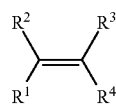

[Formula 3]

In Formula 3, $R^1$ to $R^3$ are each independently hydrogen or an alkyl group, $R^4$ is a cyano group, a phenyl group substituted or not substituted with an alkyl group, an acetyl oxy group or $COR^5$, wherein $R^5$ is an amino group substituted or not substituted with an alkyl group or alkoxy group, or a glycidyloxy group.

The alkyl group or alkoxy group defined in $R^1$ to $R^3$ of Formula 3 may refer to an alkyl group or alkoxy group having 1 to 8 carbon atoms, and in one example, may be a methyl group, an ethyl group, a methoxy group, an ethoxy group, a propoxy group or a butoxy group.

More specifically, the functional monomer according to Formula 3 may be, but is not limited to, for example, one or two or more of a nitrogen-containing monomer such as (meth)actylonitrile, (meth)acrylamide, N-methyl (meth)acrylamide or N-butoxy methyl (meth)acrylamide; a styrene-based monomer such as styrene or methyl styrene; a glycidyl (meth)acrylate; and a carboxylic acid vinyl ester such as vinyl acetate.

The above-described functional monomer is preferably included in the polymer at a polymerization unit ratio of 20 parts by weight or less, which is because, when the functional monomer is included at more than 20 parts by weight, the flexibility of the pressure-sensitive adhesive composition and a peel strength may be decreased.

A method of preparing the polymer including the above-described components is not particularly limited, and the method may be, in one example, a known polymerization method such as solution polymerization, photo polymerization, bulk polymerization, suspension polymerization or emulsion polymerization.

In one example, the polymer of the present application may be prepared by solution polymerization.

The solution polymerization method may be performed by mixing a radical polymerization initiator and a solvent at a polymerization temperature of 50 to 140° C. for 6 to 15 hours, for example, while the above-described monomer component is mixed at a suitable weight ratio.

The radical polymerization initiator used to prepare the polymer is known in the art, and for example, an azo-based polymerization initiator such as azobisisobutyronitrile or azobiscyclohexane carbonitrile; or an oxide-based initiator such as benzoyl peroxide or acetyl peroxide may be used. The polymerization initiator may use one or two or more of the above-described materials, and the content may be 0.005 to 1 part by weight. Also, the solvent used to prepare the polymer is known in the art, and may be, for example, ethyl acetate or toluene, but the present application is not limited thereto.

The pressure-sensitive adhesive composition of the present application may include a multifunctional crosslinking agent capable of forming a crosslinking structure by a reaction with a crosslinkable function group included in the above-described polymer.

In one example, the pressure-sensitive adhesive composition for an optical film of the present application may further include 0.01 to 10 parts by weight of the multifunctional crosslinking agent with respect to 100 parts by weight of the polymer. The term "multifunctional crosslinking agent" used herein may refer to a multifunctional compound including two or more functional groups capable of reacting with a crosslinkable functional group included in a crosslinkable acrylic polymer in one molecule, for example, a multifunctional compound including two to six functional groups in one molecule. The two or more functional groups included in one molecule may be the same as or different from each other.

A specific type of the multifunctional crosslinking agent included in the pressure-sensitive adhesive composition is not particularly limited, and may be, for example, a bifunctional or more compound including one or more functional groups selected from an isocyanate group, a carboxyl group, an epoxy group, an acid anhydride group, an aziridinyl group, a carbodiimide group, an amine group and an oxazoline group.

In one example, the multifunctional crosslinking agent including an isocyanate group may be an aromatic polyisocyanate such as 1,3-phenylenediisocyanate, 4,4'-diphenyldiisocyanate, 1,4-phenylenediisocyanate, 4,4'-diphenylmethanediisocyanate, 2,4-tolylenediisocyanate, 2,6-tolylenediisocyanate, 4,4'-toluidinediisocyanate, 2,4,6-triisocyanatetoluene, 1,3,5-triisocyanatebenzene, dianisidine diisocyanate, 4,4'-diphenyletherdiisocyanate, 4,4',4''-triphenylmethanetriisocyanate or xylene diisocyanate; an aromatic polyisocyanate such as tri-methylene diisocyanate, tetra-methylene diisocyanate, hexa-methylene diisocyanate, penta-methylene diisocyanate 1,2-propylenediisocyanate, 2,3-butylenediisocyanate, 1,3-butalenediisocyanate, dodeca-methylene diisocyanate or 2,4,4-trimethylhexamethylenediisocyanate; an aliphatic polyisocyanate such as ω,ω'-diisocyanate-1,3-dimethylbenzene, ω,ω'-diisocyanate-1,4-dimethylbenzene, ω,ω'-diisocyanate-1,4-diethylbenzene, 1,4-tetramethylxylylenediisocyanate, 1,3-tetramethylxylenediisocyanate; an alicyclic polyisocyanate such as 3-isocyanatemethyl-3,5,5-trimethylcyclohexylisocyanate, 1,3-cyclopentanediisocyanate, 1,3-cyclohexanediisocyanate, 1,4-cyclohexanediisocyanate, methyl-2,4-cyclohexanediisocyanate, methyl-2,6-cyclohexanediisocyanate, 4,4'-methylenebis(cyclohexylisocyanate) or 1,4-bis(isocyanatomethyl)cyclohexane, or a reaction product of one or more of the above-described polyisocyanate and a polyol.

In one example, the multifunctional crosslinking agent including a carboxyl group may be, for example, an aromatic dicarboxylic acid such as o-phthalic acid, isophthalic acid, terephthalic acid, 1,4-dimethylterephthalic acid, 1,3-dimethylisophthalic acid, 5-sulfo-1,3-dimethylisophthalic acid, 4,4-bidphenyldicarboxylic acid, 1,4-naphthalenedicarboxylic acid, 2,6-naphthalenedicarboxylic acid, norbornene dicarboxylic acid, diphenylmethane-4,4'-dicarboxylic acid or phenylindandicarboxylic acid; an aromatic dicarboxylic acid anhydride such as phthalic anhydride, 1,8-naphthalenedicarboxylic acid anhydride or 2,3-naphthalenedicarboxylic acid anhydride; an alicyclic dicarboxylic acid such as hexahydrophthalic acid; an alicyclic dicarboxylic acid anhydride such as hexahydrophthalic anhydride, 3-methyl-hexahydrophthalic anhydride, 4-methyl-hexahydrophthalic anhydride or 1,2-cyclohexanedicarboxylic acid anhydride; or an aliphatic dicarboxylic acid such as oxalic acid, malonic acid, succinic acid, adipic acid, sebacic acid, azelaic acid, suberic acid, maleic acid, chloromaleic acid, fumaric acid, dodecanoic acid, pimellic acid, citraconic acid, glutaric acid or itaconic acid.

In one example, the multifunctional crosslinking agent including an epoxy group may be ethyleneglycoldiglycidylether, triglycidylether, trimethylolpropanetriglycidylether, N,N,N',N'-tetraglycidylethylenediamine, or glycerin diglycidylether.

In one example, the multifunctional crosslinking agent including an acid anhydride group may be pyromellitic anhydride, benzophenonetetracarboxylic acid dianhydride, biphenyltetracarboxylic acid dianhydride, oxydiphthalic acid dianhydride, diphenyl sulfone tetracarboxylic acid dianhydride, diphenyl sulfide tetracarboxylic acid dianhydride, butanetetracarboxylic acid dianhydride, perylene tetracarboxylic acid dianhydride, or naphthalenetetracarboxylic acid dianhydride.

In one example, the multifunctional crosslinking agent including an aziridinyl group may be N,N'-toluene-2,4-bis (1-aziridinecarboxide), N,N'-diphenylmethane-4,4'-bis(1-aziridinecarboxide), triethylenemelamine, or tri-1-aziridinylphosphineoxide.

In one example, the multifunctional crosslinking agent including the amine group may be an aliphatic diamine such as ethylenediamine or hexamethylenediamine; an alicyclic diamine such as 4,4'-diamino-3,3'-dimethyldicyclohexylmethane, 4,4'-diamino-3,3'-dimethyldicyclohexyl, diaminocyclohexane or isophoronediamine; or an aromatic diamine such as xylenediamine.

The pressure-sensitive adhesive composition of the present application may further include an antistatic agent. In the present application, the antistatic agent is included in the pressure-sensitive adhesive composition to serve to provide an antistatic performance of the pressure-sensitive adhesive layer, and all of the known antistatic agents that can be chelated by an alkylene oxide group included in the polymer as described above may be used.

As the antistatic agent, for example, an ionic compound may be used.

As an ionic compound, for example, a metal salt or an organic salt may be used.

An ionic metal salt compound may include, for example, an alkali metal cation or alkali earth metal cation. The cation may be one or two or more of a lithium ion ($Li^+$), a sodium ion ($Na^+$), a potassium ion ($K^+$), a rubidium ion ($Rb^+$), a cesium ion ($Cs^+$), a beryllium ion ($Be^{2+}$), a magnesium ion ($Mg^{2+}$), a calcium ion ($Ca^{2+}$), a strontium ion ($Sr^{2+}$) and a barium ion ($Ba^{2+}$), for example, one or two or more of a lithium ion, a sodium ion, a potassium ion, a magnesium ion, a calcium ion and a barium ion, or a lithium ion may be used in consideration of ion stability and mobility.

An anion included in the metal salt may be $PF_6^-$, $AsF^-$, $NO_2^-$, fluoride ($F^-$), chloride ($Cl^-$), bromide ($Br^-$), iodide ($I^-$), perchlorate ($ClO_4^-$), hydroxide ($OH^-$), carbonate ($CO_3^{2-}$), nitrate ($NO_3^-$), trifluoromethanesulfonate ($CF_3SO_3^-$), sulfonate ($SO_4^-$), hexafluorophosphate ($PF_6^-$), methylbenzenesulfonate ($CH_3(C_6H_4)SO_3^-$), p-toluenesulfonate ($CH_3C_6H_4SO_3^-$), tetraborate ($B_4O_7^{2-}$), carboxybenzenesulfonate ($COOH(C_6H_4)SO_3$), trifluoromethanesulfonate ($CF_3SO_2^-$), benzoate ($C_6H_5COO^-$), acetate ($CH_3COO^-$), trifluoroacetate ($CF_3COO^-$), tetrafluoroborate ($BF_4^-$), tetrabenzylborate ($B(C_6H_5)_4^-$) or tris(pentafluoroethyl)trifluorophosphate ($P(C_2F_5)_3F_3^-$).

In another example, the anion included in the metal salt may be an anion represented by Formula 4 or bis(fluorosulfonyl)imide.

[Formula 4]

In Formula 4, A is a nitrogen atom or a carbon atom, B is a carbon atom or a sulfur atom, $R_f$ is a perfluoroalkyl group, m is 1 or 2, and n is 2 or 3.

In Formula 4, when B is carbon, m may be 1, when B is a sulfur, m may be 2, when A is nitrogen, n may be 2, and when A is carbon, n may be 3.

The anion or bis(fluorosulfonyl)imide of Formula 4 has a high electronegativity because of a perfluoroalkyl group ($R_f$) or a fluoro group, includes a specific resonance structure, forms a weak bond with a cation and has hydrophobicity. Therefore, the ionic compound may provide a high antistatic property while having excellent compatibility with another component of the composition such as a polymer, even in small amounts.

The $R_f$ of Formula 4 may be a perfluoroalkyl group having 1 to 20, 1 to 12, 1 to 8 or 1 to 4 carbon atoms, and in this case, the perfluoroalkyl group may have a linear, branched or cyclic structure. The anion of Formula 4 may be a sulfonylmethide-, sulfonylimide-, carbonylmethide- or carbonylimide-based anion, and specifically, one or a mixture of two or more of tristrifluoromethanesulfonylmethide, bistrifluoromethanesulfonylimide, bisperfluorobutanesulfonylimide, bispentafluoroethanesulfonylimide, tristrifluoromethanecarbonylmethide, bisperfluorobutanecarbonylimide and bispentafluoroethanecarbonylimide.

In an organic salt ionic compound, for example, the anion component may be included with an anion, for example, a tertiary ammonium such as N-ethyl-N,N-dimethyl-N-propylammonium, N,N,N-trimethyl-N-propylammonium, N-methyl-N,N,N-tributyl ammonium, N-ethyl-N,N,N-tributylammonium, N-methyl-N,N,N-trihexyl ammonium, N-ethyl-N,N,N-trihexylammonium, N-methyl-N,N,N-trioctylammonium or N-ethyl-N,N,N-trioctylammonium, phosphonium, pyridinium, imidazolium, pyrolidinium or piperidinium.

Also, the ionic compound used as the antistatic agent of the present application may be the metal salt in combination with the organic salt when needed.

In the pressure-sensitive adhesive composition, a content of the antistatic agent may be determined within a suitable range by considering problems in terms of endurance reliability according to a decrease in antistatic performance and cohesive strength of the pressure-sensitive adhesive layer. In one example, the antistatic agent may be included in the pressure-sensitive adhesive composition at 0.01 to 10 parts by weight with respect to 100 parts by weight of the polymer. This is because, when the content of the antistatic agent is less than 0.01 part by weight, the antistatic performance may be decreased, and when the content of the antistatic agent is more than 10 parts by weight, the endurance reliability of the pressure-sensitive adhesive layer may be decreased due to the decrease in cohesive strength.

The pressure-sensitive adhesive composition of the present application may also include a silane-based coupling agent in addition to the above-described component. The coupling agent may increase cohesive property and adhesive stability between the pressure-sensitive adhesive and the substrate, thereby improving heat and humidity resistances, and enhance adhesive reliability when being left for a long time under a high temperature and/or high humidity condition. In the present application, particularly, as a silane-based coupling agent having a specific structure that can react with the crosslinkable functional group containing a polymer, for example, a hydroxyl group, a silane-based coupling agent containing an acetoacetate group or a β-cyanoacetyl group may be used. Examples of the coupling agents may include γ-acetoacetate propyl trimethoxy silane, γ-acetoacetate propyl triethoxy silane, β-cyanoacetyl trimethoxy silane and β-cyanoacetyl triethoxy silane. In the present application, one or a mixture of two or more of the above-described coupling agents may be used. Such a silane-based coupling agent may be included in the composition at 0.01 to 1 part by weight with respect to 100 parts by weight of the polymer.

Also, the pressure-sensitive adhesive composition of the present application may further include one or more additive selected from the group consisting of a tackifier, a curing agent, a UV stabilizer, an antioxidant, a coloring agent, a reinforcing agent, a filler, a foaming agent, a surfactant and a plasticizer without influencing the effect of the present application.

The pressure-sensitive adhesive composition of the present application is a pressure-sensitive adhesive composition for an optical film. The pressure-sensitive adhesive composition for an optical film may be used to stack an optical film such as a polarizing film, a retardation film, an antiglare film, a wide-viewing angle compensation film or a brightness-enhancing film, or attach the optical film or a stacked structure thereof to an adherent such as a liquid crystal panel.

In one example, the pressure-sensitive adhesive composition may be a pressure-sensitive adhesive composition for a polarizing plate, which is used to attach the polarizing plate including an optical film such as a polarizing film to a liquid crystal panel.

In one example, the polarizing plate of the present application may include an optical film and a pressure-sensitive adhesive layer formed on one or both surfaces of the optical film, and be formed from the pressure-sensitive adhesive composition for an optical film. The pressure-sensitive adhesive composition for an optical film may include a polymer which includes 60 to 80 parts by weight of an alkyl (meth) acrylate having an alkyl group having 4 to 12 carbon atoms, 1 to 5 parts by weight of the monomer of Formula 1, 5 to 20 parts by weight of a polymerizable monomer including an aromatic group, 7 to 12 parts by weight of a hydroxyalkyl (meth)acrylate having an alkyl group having 2 or less carbon atoms, 0.1 to 2 parts by weight of hydroxyalkyl (meth) acrylate having an alkyl group having in the range of 3 to 6 carbon atoms, and 0.01 to 0.5 parts by weight of a carboxyl group-containing polymer monomer as polymerization units, with respect to a total of 100 parts by weight.

[Formula 1]

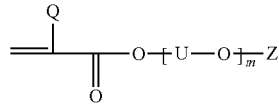

In Formula 1, Q is hydrogen or an alkyl group having 1 to 4 carbon atoms, U is an alkylene group having 1 to 4 carbon atoms, Z is an alkyl group having 1 to 20 carbon atoms, and m is a number in the range of 1 to 3.

The optical film on which the pressure-sensitive adhesive layer of the present application is formed may be, for example, a polarizing film, a retardation film, an antiglare film, a wide-viewing angle compensation film or a brightness-enhancing film, but the type of the optical film is not particularly limited.

In one example, the optical film may be a polarizing film. As the polarizing film, a film prepared by adding a polarizing component such as an iodine or dichroic dye to a film formed of a polyvinyl alcohol-based resin, and stretching the resultant film. Here, as the polyvinyl alcohol-based resin, polyvinyl alcohol, polyvinyl formal, polyvinyl acetal or a saponified product of a vinyl acetate copolymer may be used. Also, a thickness of the polarizing film is not particularly limited, and the polymerizing film is preferably formed to a conventional thickness.

The polarizing plate of the present application may be formed in a multi-layer film in which a protective film, for example, a cellulose-based film such as triacetyl cellulose, a polyester-based film such as a polycarbonate film or a poly(ethylene terephthalate) film, a polyethersulfone-based film, and/or a polyolefin-based film such as a polyethylene film, a polypropylene film or a polyolefin film having a cyclic or norbornene structure or an ethylene propylene copolymer is stacked on one or both surfaces of the polarizing film. Here, a thickness of the protective film is not particularly limited, either, and the protective film may be formed to a conventional thickness.

On the optical film described above, the pressure-sensitive adhesive layer is formed from the pressure-sensitive adhesive composition. A method of forming such a pressure-sensitive adhesive layer is not particularly limited.

In one example, the method of forming the pressure-sensitive adhesive layer may be a method of coating an optical film with a pressure-sensitive adhesive composition using a common means such as a bar coater, or a method of manufacturing a pressure-sensitive adhesive layer by coating the surface of a peelable base with a pressure-sensitive adhesive composition and drying the coated surface and transferring a pressure-sensitive adhesive layer to the surface of an optical film using the peelable base.

In the above-described process, the multifunctional crosslinking agent included in the composition may be controlled to perform the crosslinking reaction of a functional group in the formation of a pressure-sensitive adhesive layer in terms of uniform coating. That is, the multifunctional crosslinking agent has a crosslinking structure formed in drying and aging processes after coating, and thus has an increased cohesive strength and increased pressure-sensitive adhesive property and cuttability of a pressure-sensitive adhesive product.

To cure the pressure-sensitive adhesive composition of the present application in the manufacture of the polarizing plate, a curing method through radiation with an active energy ray such as a UV ray or an electron beam may be used, and a curing method through UV radiation is preferably used. Such UV radiation may be performed using a means such as a high pressure mercury lamp, an electrodeless lamp, or a xenon lamp.

In the UV radiation method, a radiation dose is not particularly limited as long as it is controlled to sufficiently cure without damaging any property of the pressure-sensitive adhesive layer, and, for example, the illumination may be 50 to 1,000 mW/cm$^2$, and the quantity of light may be 50 to 1,000 mJ/cm$^2$.

The present application also relates to a liquid crystal display device including a liquid crystal panel in which the polarizing plate according to the present application is bonded to one or both surfaces of a liquid crystal cell. A type of liquid crystal cell constituting the liquid crystal display device of the present application is not particularly limited, and includes general liquid crystal cells such as a twisted neumatic (TN)-, super twisted neumatic (STN)-, in plane switching (IPS)- and VA (vertical alignment (VA)-mode cells. Also, types and manufacturing methods of other components included in the liquid crystal display device of the present application are not particularly limited, and components generally used in the art may be employed and used without limitation.

Also, the pressure-sensitive adhesive composition of the present application may be used in an industrial sheet, particularly, a protective film, a reflective sheet, a pressure-sensitive adhesive sheet for a structure, a pressure-sensitive adhesive sheet for a photograph, a pressure-sensitive adhesive sheet for lane marking, or a pressure-sensitive adhesive for an electronic component. Also, the pressure-sensitive adhesive composition of the present application may be applied to applications having the same action concept such as multi-layer laminate products, that is, general industrial pressure-sensitive adhesive sheets, medical patches, and heat activated pressure sensitive adhesives.

Hereinafter, to help in understanding of the present application, exemplary examples are provided, but the following examples are merely provided to exemplify the present application, and the scope of the present application is not limited to the following examples.

[Methods of Evaluating Physical Properties]

1. Evaluation of Molecular Weight

A number average molecular weight (Mn) and a polydispersity index (PDI) were measured using GPC under the conditions below, and standard polystyrene produced by Agilent Systems was used to produce a calibration curve by which the measurement results were converted.

<Measurement Conditions>
Measuring Tool: Agilent GPC (Agilent 1200 series, U.S.)
Column: Two connected PL mixed Bs
Column Temperature: 40° C.
Eluent: Tetrahydrofuran (THF)
Flow Rate: 1.0 mL/min
Concentration: ~1 mg/mL (100 μl injection)

2. Evaluation of Coatability

Pressure-sensitive adhesive compositions prepared in Examples and Comparative Examples were used to coat, and coating layers were observed with the naked eye to evaluate under the following criteria.

<Evaluation Criteria>
A: Bubbles and stripes present on a coating layer were not observed with the naked eye.
B: Subtle bubbles and stripes present on a coating layer were observed with the naked eye.
C: Bubbles and stripes present on a coating layer were markedly observed with the naked eye.

3. Evaluation of Repeelability

The prepared pressure-sensitive adhesive polarizing plate was cut to a size of 25 mm×100 mm (width×length), thereby preparing a sample, a peel sheet was removed, and then the resultant sample was attached to an alkali-free glass using a laminator. Subsequently, pressing was performed in an autoclave (50° C., 5 atm) for about 20 minutes, and stored under a constant temperature and constant humidity condition (23° C., 50% R.H.) for 24 hours. Afterward, using a property detector (Texture analyzer, Stable Micro Systems), repeelability was evaluated at a peel rate of 0.3 m/min and a peeling angle of 180 degrees.

○: After 1 day, a pressure-sensitive adhesive strength was less than 1,000 gf.
Δ: After 1 day, a pressure-sensitive adhesive strength was 1,000 gf or more.
X: After 1 day, a pressure-sensitive adhesive strength was 2,000 gf or more.

4. Evaluation of Surface Resistance of Pressure-Sensitive Adhesive Layer

A pressure-sensitive adhesive polarizing plate on which a pressure-sensitive adhesive was formed was cut to a size of 50 mm×50 mm (width×length), thereby preparing a sample, a release PET attached to the pressure-sensitive adhesive layer of the sample was removed, and surface resistance was measured.

The surface resistance was measured using MCP-HT 450 equipment (Mitsubishi chemical, Japan) according to a manufacturer's manual.

A surface resistance (SR1) before a durability test was measured after the cut sample was left at 23° C. and a relative humidity of 50% for 24 hours, a release PET was removed from the polarizing plate, and a voltage of 500 volt (V) was supplied for 1 minute.

5. Evaluation of Pressure-Sensitive Adhesive/Base-Interface Adhesive Strength

In the processes of manufacturing the pressure-sensitive adhesive polarizing plates according to Examples and Comparative Examples, a pressure-sensitive adhesive layer was formed, a polarizing plate left for about the time mentioned in evaluation criteria below was cut to a size of 7 cm×10 cm (width×length), a peel sheet (a release PET film) was removed, a pressure-sensitive adhesive tape (a pressure-sensitive adhesive tape for measurement) to measure peeling of the pressure-sensitive adhesive using a laminator was attached to a pressure-sensitive adhesive area of 5 cm×10 cm (width×length). Afterward, under constant temperature and humidity conditions (25° C., 50% relative humidity) for 5 minutes, an amount of residual pressure-sensitive adhesive on a base surface of the polarizing plate was checked while the attached pressure-sensitive adhesive tape for measurement was removed. A lattice was drawn in a vertical direction of the polarizing plate, and an amount of the pressure-sensitive adhesive remaining in the lattice was checked with the naked eye.

<Evaluation Criteria>
A: Within 1 day after coating, 90% or more of the pressure-sensitive adhesive remained.
B: Within 2 days after coating, 90% or more of the pressure-sensitive adhesive remained.
C: Within 3 days after coating, 90% or more of the pressure-sensitive adhesive remained.
D: Within 4 days after coating, 90% or more of the pressure-sensitive adhesive remained.

6. Evaluation of Thermal and Moisture Resistance Durability

A specimen was prepared by cutting the polarizing plates prepared in Examples and Comparative Examples to have a width of about 180 mm and a length of about 320 mm, and attached to a 19-inch commercially-available panel. Afterward, the panel was stored in an autoclave (50° C., 5 atm) for about 20 minutes, thereby manufacturing a sample. Heat resistance durability was evaluated according to the following criteria by maintaining the manufactured sample at 80° C. for 500 hours, and observing the generation of bubbles and peeling. Humidity resistance durability was evaluated according to the criteria below by maintaining the manufactured sample at 60° C. and a relative humidity of 90% for 500 hours and observing the generation of bubbles and peeling at a pressure-sensitive adhesive interface.

<Evaluation Criteria>
A: No bubbles and peeling occurred.
B: Some bubbles and/or peeling occurred.
C: A large amount of bubbles and/or peeling occurred.

7. Evaluation of Optical Transmittance Uniformity (Light Leakage)

The uniformity of optical transmittance was examined using the same specimen used in the evaluation of endurance reliability. Specifically, a part from which light is leaked from a dark room was observed using a backlight. During the experiment, a coated polarizing plate (400 mm×200 mm) was attached to both surfaces of a glass substrate (410 mm×210 mm×0.7 mm) by intersecting optical axes. The specimen used in the evaluation of the uniformity of optical transmittance was left at 60° C. for 500 hours, or at 50° C. and a relative humidity of 90% for 500 hours, and then used at room temperature. The evaluation criteria were as follows:

○: It was difficult to observe non-uniformity of optical transmittance with the naked eye.
Δ: Some non-uniformity of optical transmittance was observed.
X: A large amount of non-uniformity of optical transmittance was observed.

[Preparation Example 1] Preparation of Polymer 70.4 parts by weight of n-butyl acrylate (n-BA), 5 parts by weight of methyl methacrylate, 4.5 parts by weight of 2-(2-ethoxyethoxy)ethyl acrylate, 10 parts by weight of 2-phenoxyethyl acrylate, 9 parts by weight of 2-hydroxyethyl acrylate, 1 part by weight of 4-hydroxybutyl and 0.10 parts by weight of acrylic acid were put into a 1 L reactor equipped with a cooling apparatus to facilitate the reflux of nitrogen gas and temperature control, and 100 parts by weight of ethyl acetate (EAc) was added as a solvent. Afterward, nitrogen gas was used for purging for 1 hour to remove oxygen, and temperature was maintained at 60° C. After 0.05 parts by weight of 2,2'-azobisisobutyronitrile (AIBN, Wako) was additionally added as a reaction initiator and reacted for 8 hours, then diluted with ethyl acetate, thereby preparing a polymer having a solid content of 18% and a weight average molecular weight of 1,450,000.

[Preparation Examples 2 to 10] Preparation of Polymer

Polymers (A2 to A10) were prepared by the method described in Preparation Example 1, except that components and parts by weight of monomers were adjusted as shown in Table 1, and the amount of an initiator was adjusted by considering a desired molecular weight.

TABLE 1

| Preparation Example | | 1 | 2 | 3 | 4 | 5 | 6 | 7 | 8 | 9 | 10 |
|---|---|---|---|---|---|---|---|---|---|---|---|
| | Polymer | A1 | A2 | A3 | A4 | A5 | A6 | A7 | A8 | A9 | A10 |
| Monomer composition | BA | 70.4 | 70 | 61.35 | 67.85 | 69.35 | 48.85 | 79.85 | 81.85 | 70 | 69.5 |
| | MMA | 5 | 5 | 5 | 5 | 5 | | 5 | 5 | 5 | 5 |
| | EOEOEA | 4.5 | 4.5 | 4.5 | | 4.5 | | 5 | | 5 | 4.5 |
| | MEA | | | | 4.5 | | | | | | |
| | PhEA | 10 | | 20 | 10 | 20 | 50 | | 10 | 10 | 10 |
| | BzA | | 10 | | | | | | | | |
| | HEA | 9 | 9 | 8 | 12 | | | 9 | 2 | 9 | 9 |
| | HBA | 1 | 1 | 1 | 0.5 | 1 | 1 | 1 | 1 | 1 | 1 |
| | AA | 0.1 | 0.5 | 0.15 | 0.15 | 0.15 | 0.15 | 0.15 | 0.15 | — | 1.5 |
| | Mw (unit: 10,000) | 145 | 135 | 135 | 140 | 140 | 130 | 145 | 150 | 150 | 145 |

Mw: weight average molecular weight
Content unit: parts by weight
BA: n-butyl acrylate
MMA: methyl methacrylate
EOEOEA: 2-(2-ethoxyethoxy)ethyl acrylate
MEA: methoxyethyl acrylate
PhEA: phenoxyethyl acrylate
BzA: benzyl acrylate
HEA: 2-hydroxyethyl acrylate
HBA: 4-hydroxybutyl acrylate
AA: acrylic acid

[Example 1] Preparation of Polarizing Plate

Preparation of Pressure-Sensitive Adhesive Composition 0.2 parts by weight of an XDI-based isocyanate curing agent (Mitsui Takeda Chemicals, Inc., D110N), 0.35 parts by weight of a β-cyanoacetyl group-containing silane-based coupling agent (LG Chemical, AD M-812) and 1 part by weight of lithium bistrifluorosulfonylimide as a solid metal salt were mixed at room temperature with respect to 100 parts by weight of the polymer prepared according to Preparation Example 1, and ethyl acetate was added to adjust the solid concentration of a coating solution to be about 9 to 10 wt %, thereby preparing a coating solution (a pressure-sensitive adhesive composition).

Preparation of Polarizing Plate

A release-treated polyethyleneterephthalate (PET) (Mitsubishi, MRF-38) film having a thickness of 30 microns (μm) as a peel sheet was coated with the prepared pressure-sensitive adhesive composition to have a dry thickness of 25 microns (μm), and dried in an oven at 110° C. for 3 minutes, thereby forming a pressure-sensitive adhesive layer. The formed pressure-sensitive adhesive layer was laminated on one surface of a protective film of an iodine-based polarizing plate (a TAC film), thereby manufacturing a pressure-sensitive adhesive polarizing plate.

[Examples 2 to 4 and Comparative Examples 1 to 6] Manufacture of Polarizing Plate A polarizing plate was manufactured by the method described in Example 1, except that blending components and a composition of the pressure-sensitive adhesive composition (the coating solution) were adjusted as shown in Table 2.

TABLE 2

|  | Example 1 | Example 2 | Example 3 | Example 4 | Comparative Example 1 | Comparative Example 2 | Comparative Example 3 | Comparative Example 4 | Comparative Example 5 | Comparative Example 6 |
|---|---|---|---|---|---|---|---|---|---|---|
| Polymer | A1 | A2 | A3 | A4 | A5 | A6 | A7 | A8 | A9 | A10 |
| Curing agent | 0.2 | 0.2 | 0.2 | 0.2 | 0.2 | 0.2 | 0.2 | 0.2 | 0.2 | 0.2 |
| Antistatic agent (A) | 1 |  | 1.5 | 1 | 1.5 | 1 | 1 | 1 | 1 | 1 |
| Antistatic agent (B) |  | 1.5 | 0.5 |  | 0.5 |  |  |  |  |  |
| SCA | 0.35 | 0.35 | 0.35 | 0.35 | 0.35 | 0.35 | 0.35 | 0.35 | 0.35 | 0.35 |

Unit: parts by weight
Curing agent D-110N (Asahi Kasei)
Antistatic agent(A) LiTFSi (3M)
Antistatic agent(B) FC-4400 (3M)
SCA AD M-812 (LG Chemical)

Properties evaluated from Examples and Comparative Examples are summarized and listed in Tables 3 and 4.

TABLE 3

|  | Example 1 | Example 2 | Example 3 | Example 4 |
|---|---|---|---|---|
| Coatability | A | A | A | A |
| Repeelability | ○ | ○ | ○ | ○ |
| Room temperature surface resistance(SR1) ($\Omega/\square$) | $2.3 \times 10^{10}$ | $2.6 \times 10^{10}$ | $6.2 \times 10^{10}$ | $2.2 \times 10^{10}$ |
| Surface resistance after heat and humidity resistance (SR2) ($\Omega/\square$) | $6.0 \times 10^{10}$ | $7.0 \times 10^{10}$ | $9.4 \times 10^{10}$ | $5.7 \times 10^{10}$ |
| Surface resistance temporal change log(SR2/SR1) | 0.4 | 0.4 | 0.2 | 0.4 |
| Pressure-sensitive adhesive/base interface adhesive strength | A | A | A | A |
| heat resistance 300 h | A | A | A | A |
| heat and humidity resistance 300 h | A | A | A | A |
| Light leakage | ○ | ○ | ○ | ○ |

TABLE 4

|  | Comparative Example 1 | Comparative Example 2 | Comparative Example 3 | Comparative Example 4 | Comparative Example 5 | Comparative Example 6 |
|---|---|---|---|---|---|---|
| Coatability | A | A | A | A | A | C |
| Repeelability | ○ | ○ | ○ | ○ | X | ○ |
| Room temperature surface resistance(SR1) ($\Omega/\square$) | $6.2 \times 10^{10}$ | $3.2 \times 10^{10}$ | $3.1 \times 10^{10}$ | $4.5 \times 10^{10}$ | $2.2 \times 10^{10}$ | $4.2 \times 10^{10}$ |
| Surface resistance after humidity resistance (SR2) ($\Omega/\square$) | $1.0 \times 10^{11}$ | $5.0 \times 10^{10}$ | $9.5 \times 10^{10}$ | $6.2 \times 10^{11}$ | $6.4 \times 10^{10}$ | $5.0 \times 10^{10}$ |
| Surface resistance temporal change log(SR2/SR1) | 0.2 | 0.2 | 0.5 | 1.1 | 0.5 | 0.1 |
| Pressure-sensitive adhesive/base interface adhesive strength | C | D | A | B | A | A |

TABLE 4-continued

| | Comparative Example 1 | Comparative Example 2 | Comparative Example 3 | Comparative Example 4 | Comparative Example 5 | Comparative Example 6 |
|---|---|---|---|---|---|---|
| heat resistance 300 h | A | A | A | A | C | A |
| heat and humidity resistance 300 h | A | C | A | A | A | C |
| Light leakage | ○ | X | X | ○ | ○ | ○ |

The present application can provide a pressure-sensitive adhesive composition capable of manufacturing a pressure-sensitive adhesive layer which has an excellent antistatic performance and less temporal change in the antistatic performance even when in long-term storage.

Also, the present application can provide a pressure-sensitive adhesive composition capable of manufacturing a pressure-sensitive adhesive layer which has excellent optical compensation and stress relaxation properties and thus can minimize a light leakage phenomenon that may occur due to a protective film, without changing main properties such as endurance reliability and workability under a high temperature and/or high humidity condition.

Moreover, the present application can provide an optical member and a liquid crystal display device which include a pressure-sensitive adhesive layer formed from the pressure-sensitive adhesive composition.

It should be apparent to those skilled in the art that various modifications can be made to the above-described exemplary embodiments of the present application without departing from the spirit or scope of the present application. Thus, it is intended that the present invention covers all such modifications provided they come within the scope of the appended claims and their equivalents.

What is claimed is:

1. A pressure-sensitive adhesive composition for an optical film, comprising:
    a polymer containing 60 to 80 parts by weight of an alkyl (meth)acrylate having an alkyl group having 4 to 12 carbon atoms, 1 to 5 parts by weight of a monomer of Formula 1, 5 to 20 parts by weight of a polymerizable monomer having an aromatic group, 7 to 12 parts by weight of a hydroxyalkyl (meth)acrylate having an alkyl group having 2 or less carbon atoms, 0.1 to 2 parts by weight of a hydroxyalkyl (meth)acrylate having an alkyl group having in the range of 3 to 6 carbon atoms, and 0.01 to 0.5 parts by weight of a carboxyl group-containing polymerizable monomer as polymerization units with respect to a total of 100 parts by weight:

[Formula 1]

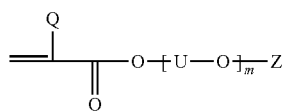

where Q is hydrogen or an alkyl group having 1 to 4 carbon atoms, U is an alkylene group having 1 to 4 carbon atoms, Z is an alkyl group having 1 to 20 carbon atoms, and m is a number in the range of 1 to 3, and wherein the monomer of Formula 1 is 2-(2-ethoxyethoxy) ethyl (meth)acrylate.

2. The composition of claim 1, wherein the polymer includes 60 to 75 parts by weight of the alkyl (meth)acrylate having an alkyl group having 4 to 12 carbon atoms as a polymerization unit.

3. The composition of claim 1, wherein the polymerizable monomer including an aromatic group is represented by Formula 2:

[Formula 2]

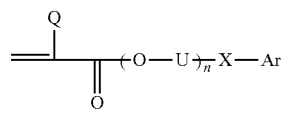

where Q is hydrogen or an alkyl group having 1 to 4 carbon atoms, U is an alkylene group having 1 to 4 carbon atoms, X is a single bond, an oxygen atom, a sulfur atom or an alkylene group having 1 to 4 carbon atoms, n is a number in the range of 0 to 3, and Ar is an aryl group having 6 to 25 carbon atoms.

4. The composition of claim 1, wherein the polymerizable monomer including an aromatic group is phenoxy ethyl (meth)acrylate, benzyl (meth)acrylate, 2-phenylthio-1-ethyl (meth)acrylate, 2-(1-naphthyloxy)-1-ethyl (meth)acrylate or 2-(2-naphthyloxy)-1-ethyl (meth)acrylate.

5. The composition of claim 1, wherein the polymer includes 7 to 15 parts by weight of the polymerizable monomer including an aromatic group as a polymerization unit.

6. The composition of claim 1, wherein the carboxyl group-containing polymerizable monomer is one or more selected from the group consisting of (meth)acrylic acid, 2-(meth)acryloyloxy acetic acid, 3-(meth)acryloyloxy propylic acid, 4-(meth)acryloyloxy butyric acid, an acrylic acid dimer, itaconic acid, maleic acid, and maleic acid anhydride.

7. The composition of claim 1, wherein the polymer further includes 1 to 5 parts by weight of methyl (meth) acrylate as a polymerization unit.

8. The composition of claim 1, further comprising:
    0.01 to 10 parts by weight of a multifunctional crosslinking agent with respect to 100 parts by weight of the polymer.

9. The composition of claim 8, wherein the multifunctional crosslinking agent is a multifunctional compound including two or more functional groups selected from the group consisting of an isocyanate group, a carboxyl group, an epoxy group, an acid anhydride group, an aziridinyl group, a carbodiimide group, an amine group and an oxazoline group.

10. The composition of claim 1, further comprising:
    0.01 to 10 parts by weight of an antistatic agent with respect to 100 parts by weight of the polymer.

11. The composition of claim 10, wherein the antistatic agent is an ionic compound.

12. The composition of claim 11, wherein the ionic compound is a metal salt or an organic salt.

13. A polarizing plate, comprising:
an optical film; and
a pressure-sensitive adhesive layer formed from the pressure-sensitive adhesive composition for an optical film of claim 1 which is formed on one or both surfaces of the optical film.

14. The polarizing plate of claim 13, wherein the optical film is a polarizing film.

15. A liquid crystal display device, comprising:
a liquid crystal panel comprising the polarizing plate of claim 13 which is bonded to one or both surfaces of a liquid crystal cell.

16. A liquid crystal display device, comprising:
a liquid crystal panel comprising the polarizing plate of claim 14 which is bonded to one or both surfaces of a liquid crystal cell.

* * * * *